Jan. 5, 1932.  F. M. HEATH  1,840,197
HORSE COLLAR CUSHION
Filed April 14, 1931   2 Sheets-Sheet 1
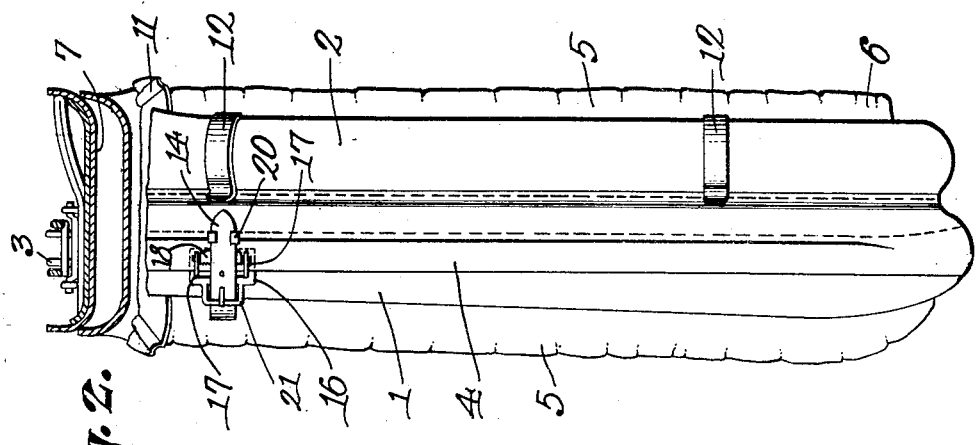
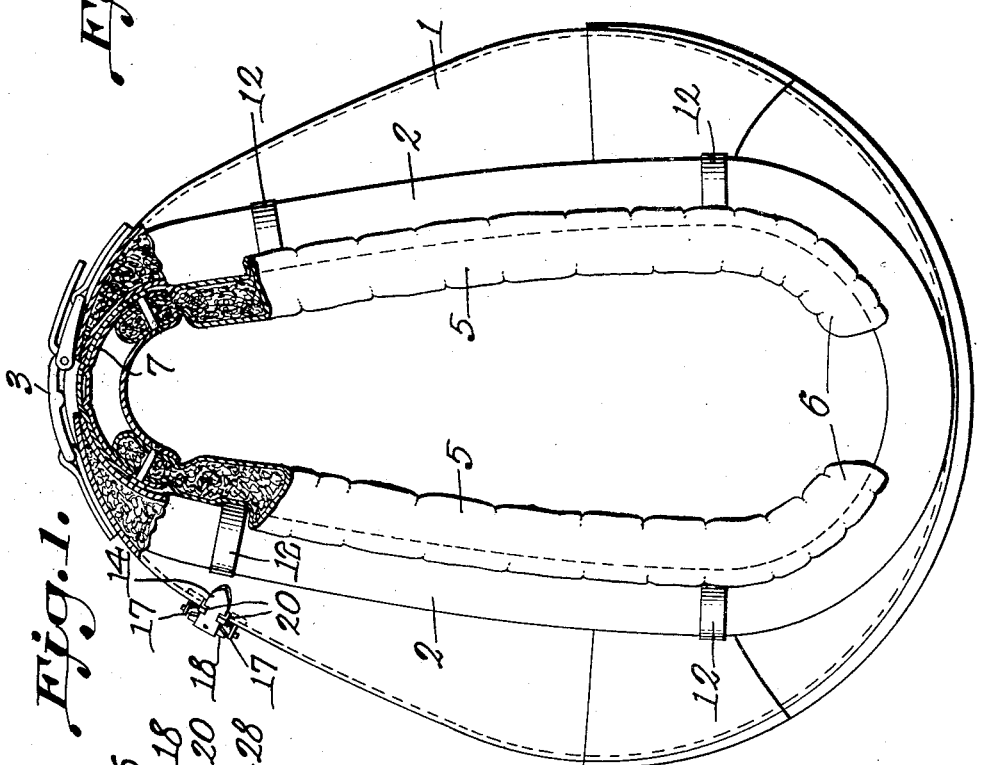
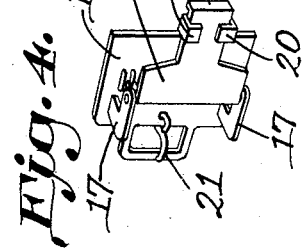
Frank M. Heath, Inventor
By C. A. Snow & Co.
Attorneys.

Jan. 5, 1932.  F. M. HEATH  1,840,197
HORSE COLLAR CUSHION
Filed April 14, 1931  2 Sheets-Sheet 2
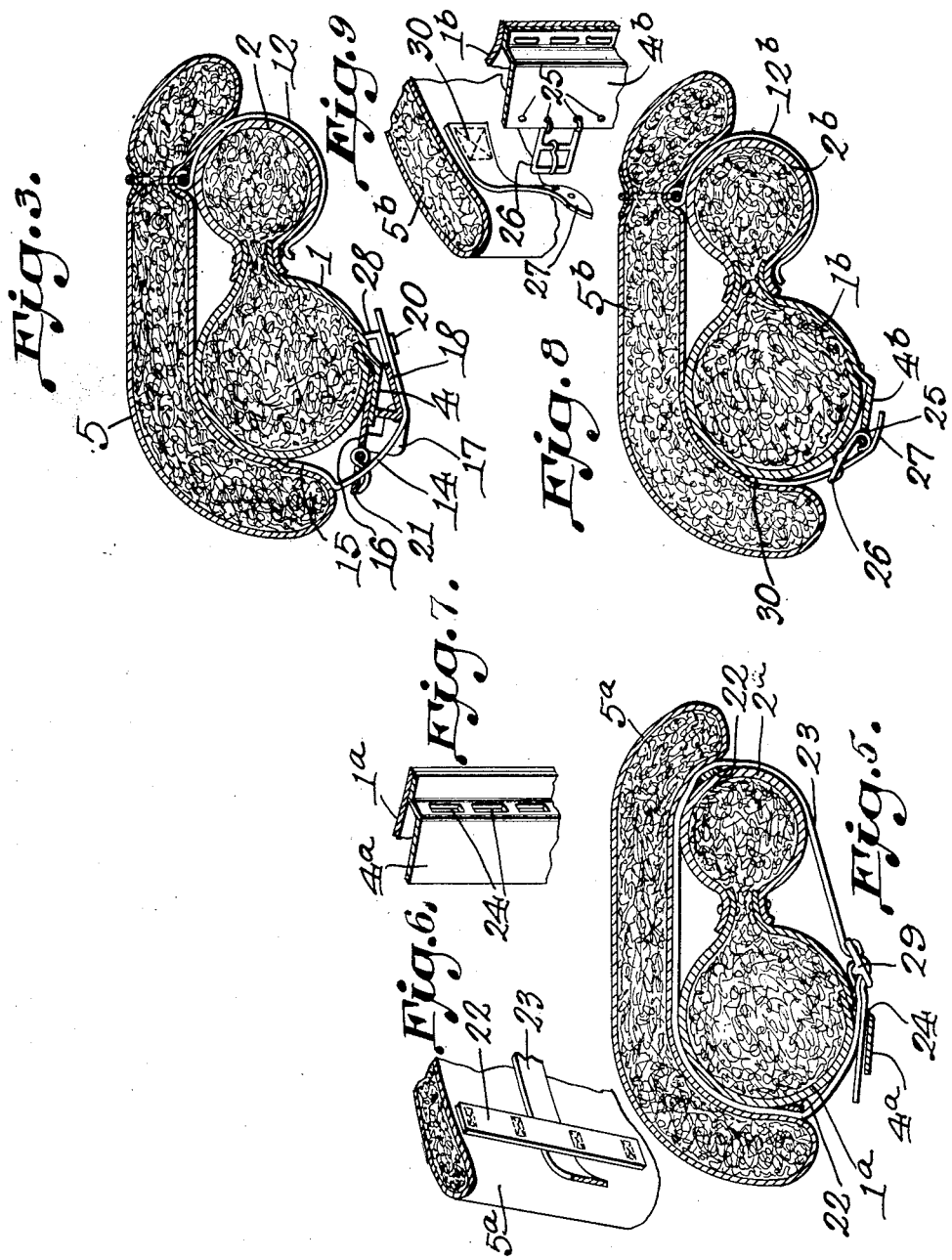
Frank M. Heath Inventor
By C. A. Snow & Co.
Attorneys.

Patented Jan. 5, 1932

1,840,197

UNITED STATES PATENT OFFICE

FRANK M. HEATH, OF SILVER SPRING, MARYLAND

HORSE COLLAR CUSHION

Application filed April 14, 1931. Serial No. 530,096.

This invention aims to provide novel means for preventing a sweat pad or cushion from slipping longitudinally of a horse collar.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows in elevation, a horse collar equipped with the pad forming the subject matter of this application, parts being in section;

Figure 2 is an elevation wherein the device is viewed edgewise, parts being in section;

Figure 3 is a cross section;

Figure 4 is a perspective view of the fastener;

Figure 5 is a cross section showing a modification;

Figure 6 is a fragmental perspective view, showing the strap attachment used in Figure 5;

Figure 7 is a fragmental perspective view, showing the tongue of Figure 5;

Figure 8 is a cross section showing another modification;

Figure 9 is a composite perspective view showing the strap attachment of Figure 8.

In Figures 1, 2 and 3, the numeral 1 marks a horse collar of any kind having a hame roll 2, the relatively movable upper ends of the collar being connected by a clasp 3 or equivalent device. One or both sides of the horse collar are supplied with a transverse tongue 4, having a free end, and shown in Figure 3.

The sweat pad or cushion 5 embodies yieldable side members 5, the lower ends 6 of which are spaced, as shown in Figure 1. The upper ends of the side members 5 of the cushion are connected by any suitable means, indicated at 7.

The cushion members 5 carry spring clips 12 engaging the hame roll 2. They are very satisfactory as a means for holding the cushion members 5 on the horse collar against movement crosswise of the collar, but they do not hold the cushion members 5 adequately against moving lengthwise of the collar. This a matter which will be discussed in detail hereinafter.

I have shown a strap 14, and there may be any desired number of these straps. In the present showing, there is but one strap, located near to the upper end of one of the cushion members 2, as disclosed in Figures 1 and 2; but some one may wish to use more than one strap, and this can be done without departing from the spirit of the invention. In Figure 3, the inner end 15 of the strap 14 is shown, and is attached to one of the cushion members 5.

There is provided a fastener for attaching the end of the strap 14 to the horse collar 1, and the fastener can be seen in perspective in Figure 4. It includes a metal base plate 16 with brackets 17 in which a cam lever 18 is pivoted. The cam lever 18 has an angular end 28, and on the shank of the cam lever there are overhanging fingers 20. A buckle 21, of any desired kind, is carried by the end of the base plate 16. The cam lever 18 is forced down until the free end of the tongue 4 of Figure 3 is gripped between one end of the cam lever and the base plate 16. In this way, the fastener of Figure 4 is attached to the horse collar, the end 28 of the cam lever coming into contact with the collar, as in Figure 3. The end of the strap 12 is engaged with the buckle 21, and is run under the fingers 20 of the cam lever, to hold the strap in place.

When the upper end of the left hand cushion member 5 in Figure 1, (the right hand or off-side cushion member, looking toward the horse's head) is secured by the strap 14, that cushion member cannot slip down.

Many different ways for holding the upper end of the left hand cushion member may be resorted to, within the spirit of the invention. I have shown several, but a harness maker can resort to others, within the scope of my invention.

In Figures 5, 6 and 7, I have shown a modification of what is disclosed in Figure 4. In Figures 5, 6 and 7, parts hereinbefore described have been designated by numerals previously used, with the suffix "*a*". Strips 22 extend lengthwise of the cushion member 5*a* near to its edges. A strap 23 passes under the strips 22 and around the horse collar. The ends of the straps 23 are connected by a buckle 29, and the free end of the strap extends under the tongue 4*a* through any one of a number of holes 24 in the tongue.

In Figures 8 and 9, parts hereinbefore described have been designated by numerals previously used, with the suffix "*b*". A buckle 26 is mounted for adjustment in the holes 25 in the tongue 4*b* and is engaged by one end of a strap 27 connected at 30 to the cushion member 5*b*.

These and many other instrumentalities may be resorted to for upholding the upper end of the left hand cushion member 5 in Figure 1, so that it will not slip down.

First, as to the longitudinal slipping of the cushion, it may be stated that although the clips 12 form a highly advantageous means for attaching the cushion to the horse collar, they do not prevent the cushion from moving lengthwise of the collar. There are several reasons why the cushion 5 should not move lengthwise of the collar 1. For instance, there are individual peculiarities in the bony shoulder structure of the horse, which demand that the collar having a bearing, by means of the cushion, in a definite place on the shoulder, and these peculiarities must be taken care of, by mounting the cushion in such a position on the collar that the cushion cannot slip lengthwise of the collar. It is not possible to provide a stock collar which will fit every horse, the cushion has to accommodate the physical, individual characteristics of the horse, and, therefore, the cushion should not slip endwise. Again, many a horse has a chronic knot or lump on the shoulder, which has to be accommodated in the cushion. Horsemen who know their business open the covering of the cushion, remove some of the inside stuffing, and make a cup or concavity in the cushion, to receive the knot. It is clear that if the cushion shifts longitudinally of the collar, the cup or concavity referred to will not receive the knot, and the edge of the cup or concavity will cut across the knot, thereby making the knot worse, and converting it into a crippling sore. Moreover, if the cushion is moved lengthwise, with respect to the collar, the connecting means 7 will not fit the neck, and the collar will not ride evenly, in its original and proper position. From all of the foregoing, and for other reasons which will suggest themselves to a person knowing anything about horses, it will be clear that a longitudinal movement of the cushion, with respect to the collar, is undesirable. Such a longitudinal movement of the cushion may take place either while the device is in use, or when the cushion is being mounted on the collar.

Having thus described the invention, what is claimed is:

1. A horse collar cushion, and means for holding the cushion on a collar, said means embodying a flexible member on the cushion, and a fastener having means for engaging both the flexible member and the collar releasably.

2. A horse collar cushion, and means for holding the cushion on a collar, said means embodying a flexible member on the cushion, a tongue, means for mounting the tongue on a collar, and a fastener having a buckle engaging the flexible member, and having a cam lever engaging the tongue, the cam lever having a holding device under which the free end of the flexible member passes and is held.

3. A horse collar cushion, and means for holding the cushion on a collar, said means embodying a flexible member on the cushion, and detachable means secured to the collar and anchoring the flexible member to the collar to prevent the cushion from moving longitudinally of the collar.

In testimony that I claim the foregoing as my own, I have hereto affixed my signature.

FRANK M. HEATH.